United States Patent [19]

Nicholson

[11] Patent Number: 5,366,323
[45] Date of Patent: Nov. 22, 1994

[54] DRAINAGE AND EROSION REDUCTION MEANS

[75] Inventor: Ian C. Nicholson, Cooranbong, Australia

[73] Assignee: Graham Lee Whitehaed, Baldoon Neville Via Blayney, Australia

[21] Appl. No.: 930,420

[22] PCT Filed: Mar. 8, 1991

[86] PCT No.: PCT/AU91/00082
§ 371 Date: Sep. 15, 1992
§ 102(e) Date: Sep. 15, 1992

[87] PCT Pub. No.: WO91/14049
PCT Pub. Date: Sep. 19, 1991

[30] Foreign Application Priority Data

Mar. 15, 1990 [AU] Australia .............................. PJ9147

[51] Int. Cl.⁵ .............................................. E02B 13/00
[52] U.S. Cl. ..................................... 405/119; 405/118; 405/36
[58] Field of Search ................. 405/15, 16, 21, 30, 405/31–35, 29, 36, 118–126; 256/1

[56] References Cited

U.S. PATENT DOCUMENTS

| 954,283 | 4/1910 | Hawkes | 405/21 |
| 1,515,709 | 11/1924 | Stowell | 405/118 |
| 3,764,446 | 10/1973 | Martin | 405/16 X |
| 3,848,853 | 11/1974 | Way et al. | 256/1 |
| 3,951,295 | 4/1976 | Hildreth | 256/1 |
| 4,022,434 | 5/1977 | Moore | 405/30 X |
| 4,824,287 | 4/1989 | Tracy | 405/43 X |
| 5,011,327 | 4/1991 | Thiac | 405/28 |
| 5,236,756 | 8/1993 | Halliburton | 405/16 X |

FOREIGN PATENT DOCUMENTS

| 2471177 | 2/1978 | Australia . |
| 512218 | 8/1979 | Australia . |
| 511399 | 9/1979 | Australia . |

*Primary Examiner*—Dennis L. Taylor
*Attorney, Agent, or Firm*—Ladas & Parry

[57] ABSTRACT

Used motor vehicle tires are subjected to a pair of radial severing cuts and thereby a peripheral segment of each tire removed. The tire remainder portions, generally constituting ¼ to ⅓ of the original tires, are then aligned side by side and connected to form an extended drainage construction which may be utilized in place of conventional larger drains with the effect of ameliorating soil erosion and washaway problems.

9 Claims, 3 Drawing Sheets

DRAINAGE AND EROSION REDUCTION MEANS

TECHNICAL FIELD

The invention relates to an improved drainage construction.

BACKGROUND ART

For most of this century we have been utilizing the pneumatic tire and then discarding it in the most convenient manner after it has reached the end of its useful life. Unfortunately, over the years these tires have been accumulating on roadsides, in backyards, in bushland and watercourses, as well as filling up land disposal areas.

In recent years, with the increase of global pollution, the decrease of available landfill sites, as well as the increase in population levels in the world, we are eventually realizing that we have to dispose of our waste products in a manner which will not allow further degradation of our environment. With this in mind we should also take into account the cost of disposal of waste products and weigh the cost against environmental degradation.

The present invention utilizes used tires in the formation of drainage constructions.

Drainage constructions have many applications in the environment, including preventing drainage erosion on roadsides, and rural, reforested, natural and developed land. Drains also are important in preventing the siltation and flooding of land.

Present drainage constructions generally require skilled construction and maintenance and consequently are often expensive.

OBJECTS OF INVENTION

It is an object of this invention to provide an improved drainage construction, utilizing used tires.

DISCLOSURE OF INVENTION

The inventor has developed a method of utilizing used tires in a drainage construction.

Thus according to one embodiment of the invention there is provided, a drainage construction comprising:
- a plurality of elements connected to form an elongate channel, by connecting means,
- each of said elements comprising a curved sector of a tire, wherein the side wall of each tire sector abuts the side wall of an adjacent sector,
- such that the inner circular section surfaces of adjacent tire wall sectors form said channel.

The used tires may be selected from those manufactured for use on any vehicle such as cars, motor bikes, and trucks, which are generally obtainable in large quantities.

The circumferential portion of the tire sectors may vary according to the depth of channel required but will generally represent ¼ to a ½ of the circumference of the tire, or alternatively the total tire can be utilized.

The side walls of the tire sectors may contain apertures adapted to receive the connecting means.

The lower tread surface of one or more tires of a section of connected tire portions may also be provided with a hole or holes adapted to receive one or more pegs for the purpose of anchoring the tire into the ground or for the purpose of slowly draining the tire so as to avoid mosquito breeding, etc.

The connecting means may be in the form of one or more elongate joining members adapted, preferably under tension, to bring the side walls of individual tire sectors into apposition.

Advantageously the connecting means will comprise parallel rods or cables which pass through the apertures in the side walls of the tire sectors, and are clamped at each end.

Generally two parallel rods or cables will pass through apertures on either side of the channel and a further rod or cable will pass through apertures in the side walls in the direction of the channel.

The elongate joining member(s) may be manufactured from any appropriate material of sufficient tensile strength and advantageously is(are) constructed of a flexible material such as flexible steel cable, synthetic or natural woven cords or rods.

The clamping means is firmly attached to the elongate member and may be adapted to allow adjustment of the member to alter its tension or position and to resiliently compress the side walls of the tire in a lateral direction creating at least a partial seal therebetween.

The clamping means may consist of any suitable means capable of fixing the joining member in place, such as a washer or end plate, and a nut, wherein the end of the rod is threaded to engage the nut.

Alternatively individual tire sectors may be joined together by any suitable adhesive, by bolts, by staples, or by any other appropriate means or a combination of the abovementioned joining means may be used.

The drainage construction according to the invention can be adapted to suit different terrains by varying the circumferential portion of the tire sectors and/or by varying the height of opposing side walls of the tire sectors relative to each other.

A drainage construction according to the invention has the additional advantage that the flow of water or other fluid down the channel will be retarded by the action of the side walls of each tire sector in forming a weir across the channel. Thus the draining water must fill and overflow each sector before proceeding down the channel, thereby lessening the damaging effects of soil erosion and downstream flooding.

BEST MODE AND OTHER MODES FOR CARRYING OUT THE INVENTION

Figure 1:
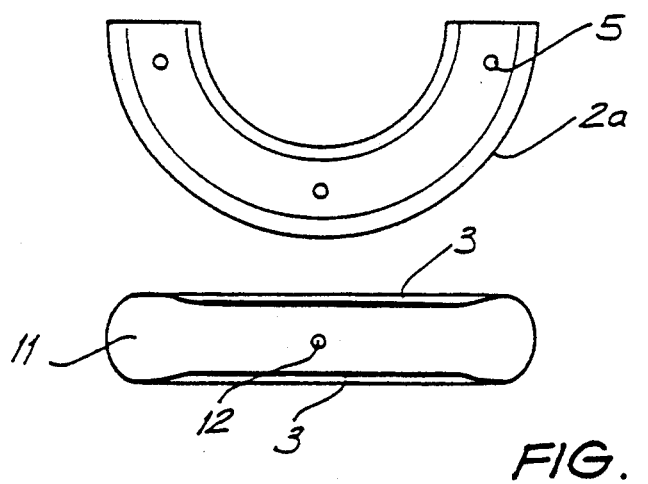
FIG. 1 depicts a side view of a tire sector according to the invention having a circumferential portion of ½ the circumference of the tire.

In the operation of the invention an open semi-circular trench 1 is dug by hand or by mechanical means, having a diameter corresponding at least approximately to the outside diameter of the tire sectors 2.

The trench may have a sand bed, or may be lined with plastic on its inner surface to prevent vegetation from growing up and displacing the tire sectors 2.

The tire sectors 2 are then placed in the trench 1 side by side with side walls 3 abutting. The elongate joining members 4 are inserted through apertures 5 in each of the side walls 3 of the tire sectors 2 and thereby extend generally parallel to the trench 1, on either side of, and along the channel 6 itself.

At each end 10 of the elongate members 4 there are provided clamping means 7 such as a washer 8 and nut 9 which engage a threaded portion of each end 10 of the members 4. The clamping means 7 allow longitudinal adjustment of the elongate members 4. The washer 8 is also provided with an aperture and the combination of washer 8 and nut 9 are not able to pass through the apertures 5 in the side walls 3 of the tire sectors 2.

Accordingly when the washers 8 and nuts 9 are engaged with the ends 10 of each of the three joining members 4, the joining members 4 may be longitudinally adjusted so that the tire sectors 2 can be drawn together between the washers 8 to prevent separation of adjoining tire sectors 2 and thereby form a seal therebetween.

The tread walls 11 of the tire sectors 2 may have a hole 12 adapted to receive a peg 13, to stably locate the tire sectors 2 in the ground, and prevent twisting or travel thereof.

The peg 13 will have an enlarged head section which is not able to pass through the hole 12.

The tire sectors 2 may have differing circumferential portions to provide varying depths of channel 6 to suit the terrain for example flat or inclined, depending on whether the drain is intended to extend down or across the incline. For example the sector 2a depicted in FIG. 1 is suitable for flat terrain or extending down hill.

Figure 2:
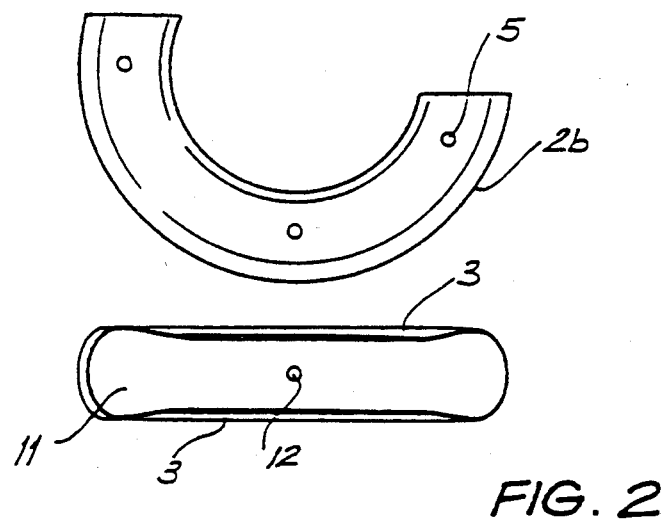
FIG. 2 depicts a side view of a tire sector having an alternative circumferential portion.
Figure 3:
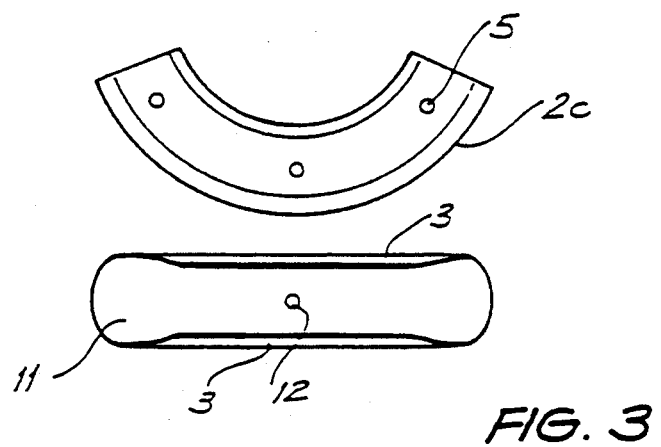
FIG. 3 depicts a side view of a tire sector having a further alternative circumferential portion.
Figure 4:
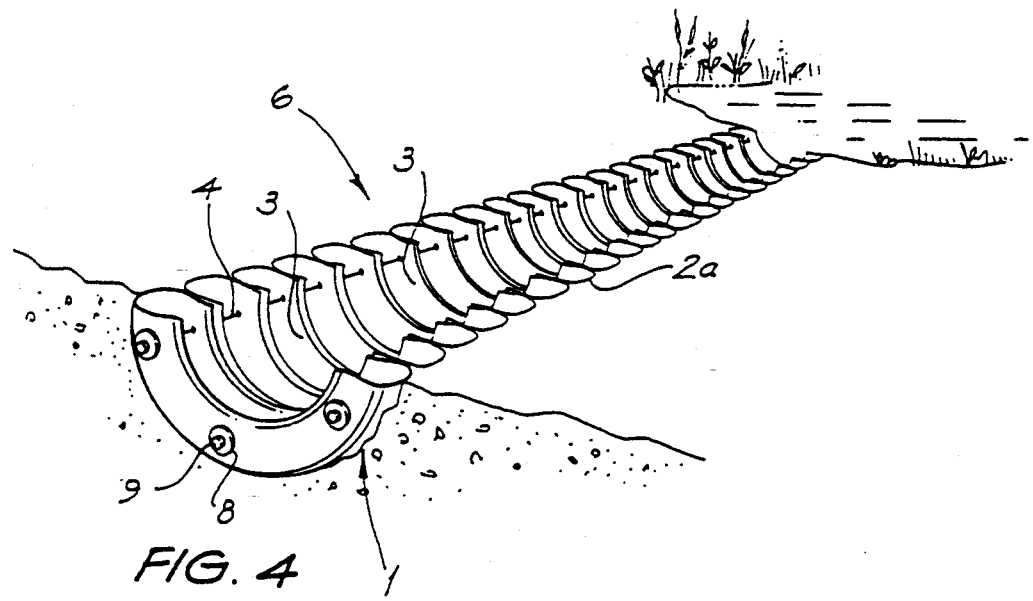
FIG. 4 depicts a plurality of adjoining tire sectors of FIG. 1 forming a drainage channel.
Figure 5:
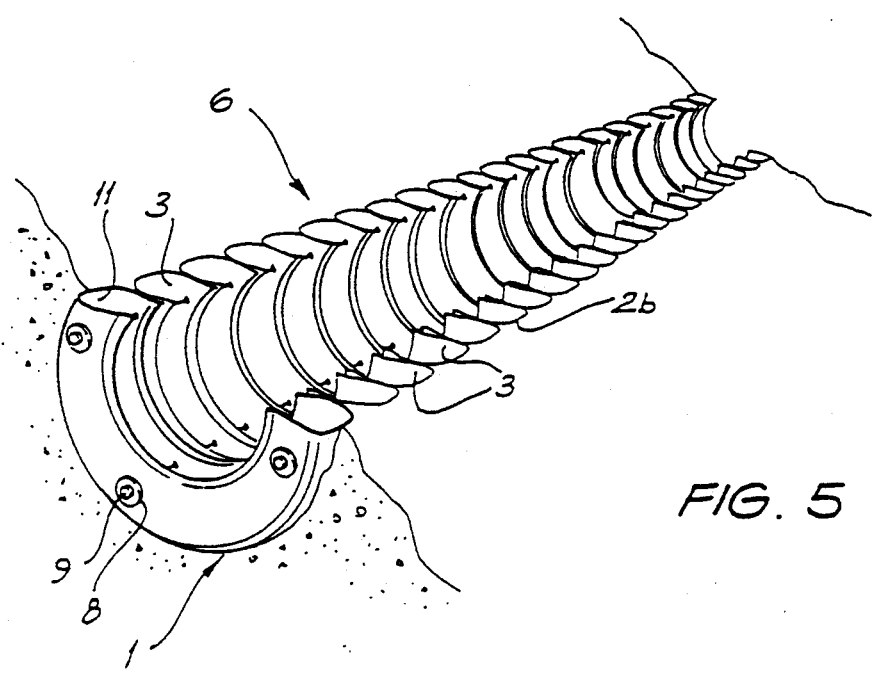
FIG. 5 depicts a plurality of adjoining tire sectors according to FIG. 2, forming a drainage channel.
Figure 6:
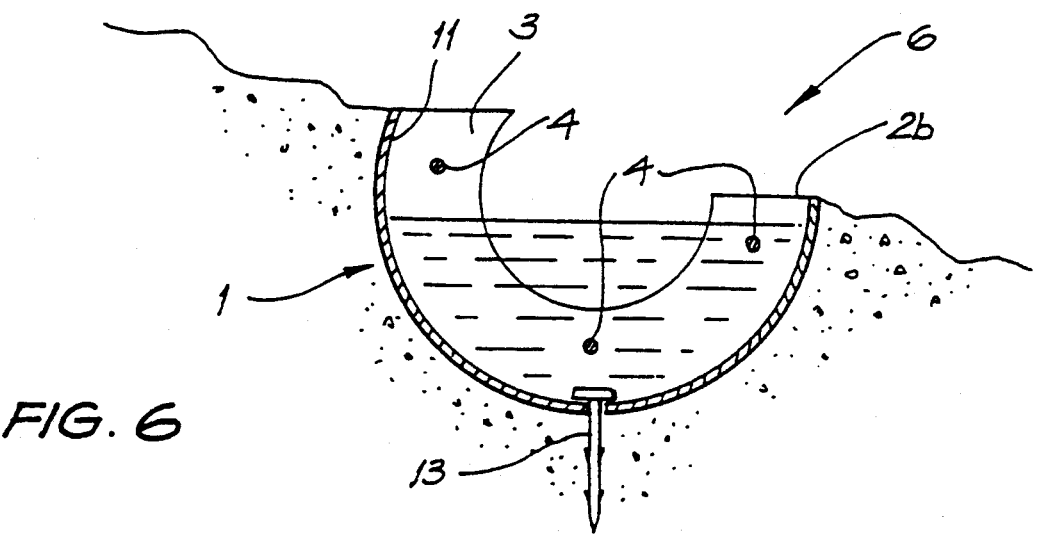
FIG. 6 depicts a cross section of a drainage channel according to the invention.

Additionally the heights of the opposing side walls 3 of the tire sectors 2 may vary relative to each other, as shown in the tire sector 2b in FIG. 2, which are suitable for a drain extending across the incline. The sector 2c shown in FIG. 3 provides a shallower drain.

INDUSTRIAL APPLICABILITY

The drainage construction according to the invention possesses several advantages over existing structures in reducing drainage maintenance and reducing conventional formal drainage costs. It also saves natural resources such as sand and cement, recycles a waste product which is creating environmental damage and increases the life of existing and future landfill sites.

Furthermore the drainage structure is economical in that it: reduces the machinery and labor required to maintain open drains, etc., reduces expensive drainage requirements downstream, reduces/or eliminates the need for sedimentation traps, reduces dredging costs, and increases staff available for the purpose of maintaining more valuable assets.

These are a few of the potential advantages which flow from the present invention which allows economical use of waste products and is environmentally friendly whilst providing a functional drainage construction.

I claim:

1. A drainage construction comprising: a plurality of elements connected by connecting means to form an elongate channel through which liquid can flow from a first area containing the liquid to a drainage area, each of said elements comprising a curved sector of a tire having at least one side wall and a rim, wherein the side wall of each tire sector abuts the side wall of an adjacent tire sector, each said tire sector comprising from ⅓ to ½ of a tire circumference, said channel being defined by the rims of successive adjacent said tire sectors, whereby at least part of a liquid introduced into said channel at said first area will flow through the tire sectors to said drainage area, the side wall of each tire sector comprising side wall means for retarding the flow of liquid through the tire sectors such that liquid flowing through the elongate channel is retarded by the side walls of the tire sectors and liquid passing through the channel from said first area must fill and overflow each of said plurality of tire sectors before proceeding to said drainage area.

2. A drainage construction as defined in claim 1 wherein each tire sector has a lower tread surface, and the lower tread surface of one or more tires of a plurality of connected tire sectors is provided with one or more holes adapted for the driving therethrough of one or more enclosing pegs.

3. A drainage construction as defined in claim 1 wherein said connecting means comprises one or more elongate joining members adapted, under tension, to bring the side walls of successive individual tire sectors into juxta position.

4. A drainage construction as defined in claim 3 wherein said connecting means comprises a pair of substantially parallel rods or cables passing through apertures in the side walls of the tire sectors and claimed at either end of said construction.

5. A drainage construction as defined in claim 4 further comprising a third rod or cable parallel to said pair of rods or cables, said third rod or cable also passing through apertures in the side walls of the tire sectors and being clamped at either end of said construction.

6. A drainage construction as defined in claim 4 wherein said rods or cables are selected from flexible steel cable, or synthetic or natural cords or rods.

7. A drainage construction as defined in claim 5 wherein said rods or cables are selected from flexible steel cable, or synthetic or natural cords or rods.

8. A drainage construction as defined in claim 4 clamped by clamping means adapted to allow adjustment of the tension in said rods or cables to resiliently compress said tire sector side walls.

9. A drainage construction as defined in claim 4 wherein successive said tire sectors are joined by one or more of adhesive or bolts or staples.

* * * * *